United States Patent
Wei et al.

(10) Patent No.: US 7,612,005 B2
(45) Date of Patent: Nov. 3, 2009

(54) CERIUM-BASED OXIDE FIBER AND ITS FABRICATING METHOD

(75) Inventors: Wen-Cheng Wei, Taipei (TW); Jia-Ming Sung, Taipei (TW); Sung-En Lin, Ji-an Township, Hualien County (TW); Je-Yan Yu, Taipei (TW)

(73) Assignee: National Taiwan University, Taipei (TW)

( * ) Notice: Subject to any disclaimer, the term of this patent is extended or adjusted under 35 U.S.C. 154(b) by 386 days.

(21) Appl. No.: 11/449,601

(22) Filed: Jun. 9, 2006

(65) Prior Publication Data
US 2007/0184965 A1   Aug. 9, 2007

(51) Int. Cl.
C04B 35/10     (2006.01)

(52) U.S. Cl. .................................... 501/95.1; 501/152

(58) Field of Classification Search ............... 501/95.1, 501/152
See application file for complete search history.

(56) References Cited

U.S. PATENT DOCUMENTS 5,380,692 A * 1/1995 Nakatsuji et al. ............ 502/303
2002/0141926 A1 * 10/2002 Vartuli et al. ................ 423/263

* cited by examiner

*Primary Examiner*—Jessica L Ward
*Assistant Examiner*—Erin B Saad
(74) *Attorney, Agent, or Firm*—The Weintraub Group, PLC

(57) ABSTRACT

This invention discloses a kind of cerium-based oxide fiber and its fabricating method. The cerium-based hydrate fiber can be synthesized by aging under the boiling point of water for 10 hours to 50 hours by the addition of a chemical modifier. The fibers show a diameter of submicron to micron size, and the aspect ratio is greater than 100. The hydrate fibers can transform to oxide fiber after calcination at high temperature.

13 Claims, 9 Drawing Sheets

TABLE 1

| STARTING COMPOSITE MATERIAL | MANUFACTURING PROCESS | REACTION TEMPERATURE, TIME AND pH VALUE | SHAPE AND PARTICLE DIAMETER OF COMPOSITE POWDER | REFERENCE DATA |
|---|---|---|---|---|
| $Ce(NO_3)_3$; $H_2O_2$; $NH_4OH$ | hydrothermal | 200°C for 6h ; PH: 10~11 | 5nm~10 nm Sphere | Lee et al. [2004] |
| $Ce(NO_3)_3$; $H_2O_2$; $NH_4OH$ | hydrothermal | 100°C for 2h; calcination at 600°C for 2h; | 5~30 nm, equi-axial shape | Zhang et al. [2004] |
| $Ce(NO_3)_3$; urea | hydrothermal | 150~300°C for 6~24h $CeCO_3OH$ (not ceria) | 10~30 μm Pike-Shape, Radiating Slice-Shape | Han et al. [2000] |
| $Ce(NO_3)_3$; urea | hydrothermal | 100°C for 0.5~3h; calcination at 500~800°C | 0.8~3 μm Pike-Shape $CeO_2$ | Lu & Wang [2002] |
| $Ce(NO_3)_3$; urea | hydrothermal | 160°C for 1h; calcination at 500°C; pH: 4~10 $CeCO_3OH$ and $CeO_2$ | Size: 3~7 μm Various Different Crystals AR: 1.3~13 | Wang & Lu [2002] |
| $Ce(NO_3)_3$; KOH | glycothermal | 200~230°C for 6h | 10~50 nm, spherical and elongated particles | Bae et al. [2002] |
| $Ce(NO_3)_3$; $NH_4OH$ | Co-ppt | Aging temperature: 20~70°C for 1~20h | nano-sized, Nano-Sized In-line and Whisker-Crystalline Deposit Particles | Chen et al. [2002] |
| $Ce(NO_3)_3 6H_2O$ Gd compounds HETAmine | Co-ppt and others | Aging 350°C Or sintering at 1200°C | Nano sized, well dispersed powder | Vasylkiv et al. [2005] |
| $Ce(SO_4)_2 6H_2O$ $H_2SO_4$ | ppt. | 90°C up to 12 hr | In-line Particles, Cylindrical Nano-Sized Crystal or Hexagonal Nano-Sized Crystal | Hsu et al. [1988] |
| $Ce(NO_3)_3$; urea | Titration to urea solution | With seed, 100°C | 3-nm Particles having good aggregation and distribution | Tsai (2005) |

TABLE 2

| No. | Concentration(M) | | | Aging period(h) | [NaOH]/[$C_6H_8O_7$] | notes |
|---|---|---|---|---|---|---|
| | $Ce(NO_3)_3$ | NaOH | $C_6H_8O_7$ | | | |
| 1-1 | 0.025 | 0.025 | 0.2 | 30 | 0.125 | No precipitate |
| 1-2 | 0.025 | 0.05 | 0.2 | 3-40 | 0.25 | |
| 1-3 | 0.025 | 0.075 | 0.2 | 3-40 | 0.375 | |
| 1-4 | 0.025 | 0.125 | 0.2 | 3-95 | 0.625 | |
| 2-1 | 0.025 | 0.075 | 0.11 | 3-40 | 0.682 | |
| 2-2 | 0.025 | 0.075 | 0.125 | 3-40 | 0.6 | |
| 2-3 | 0.025 | 0.075 | 0.3 | 20 | 0.25 | |
| 2-4 | 0.025 | 0.075 | 0.5 | 20 | 0.15 | No precipitate |

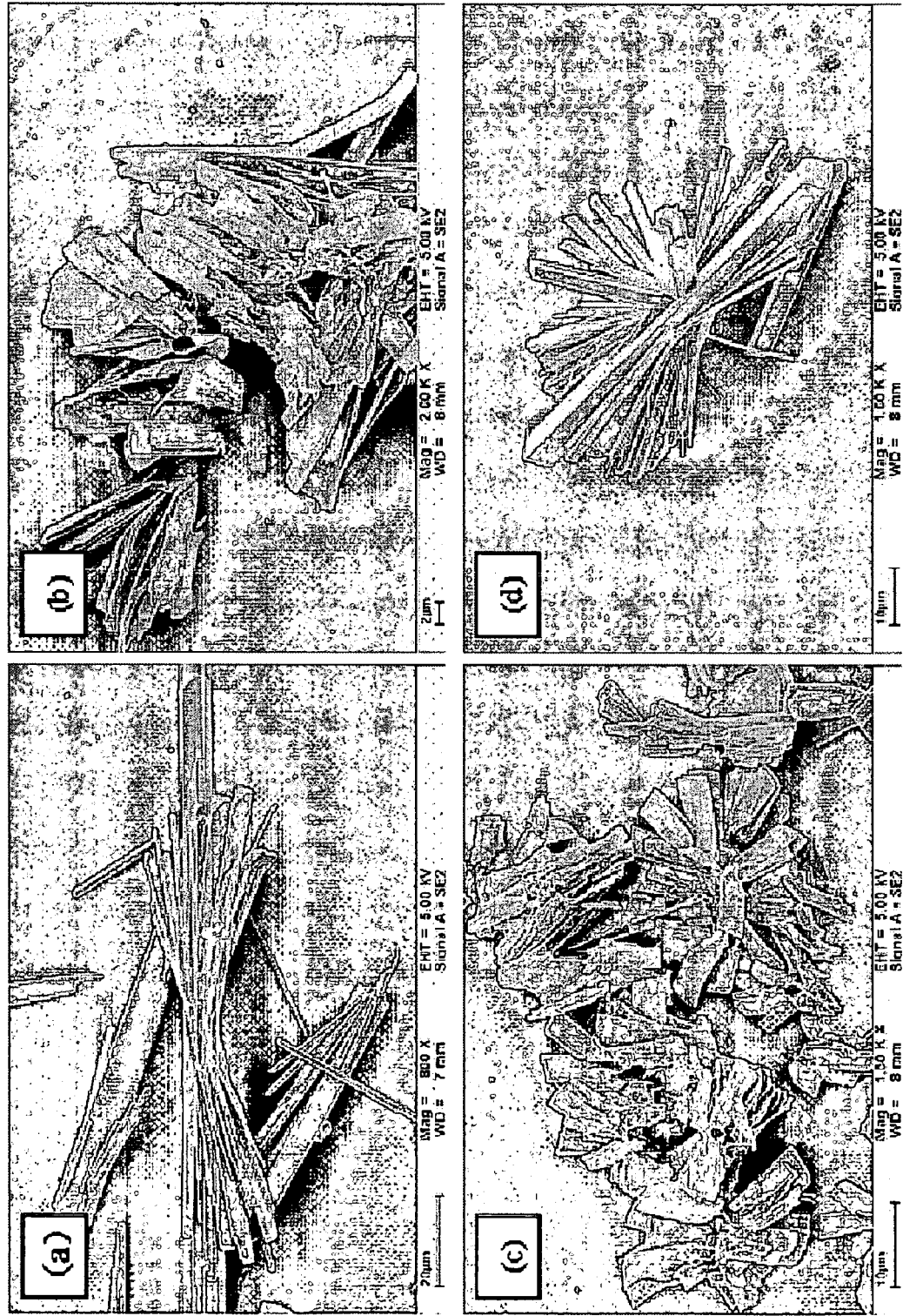

ATTACHMENT 2
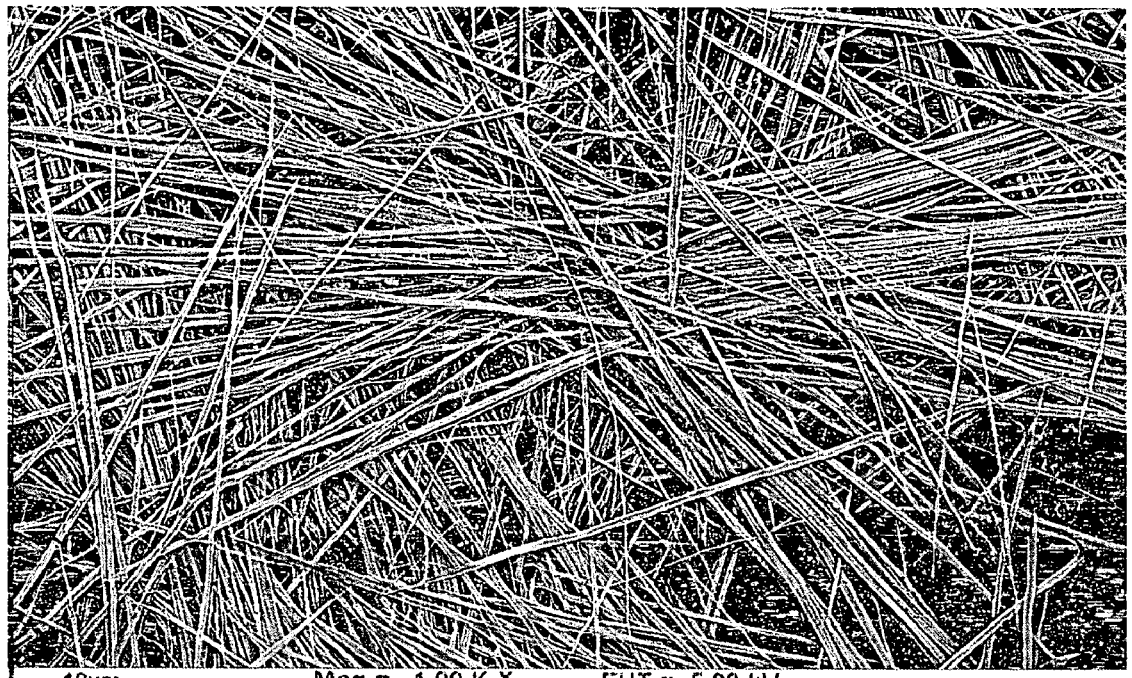
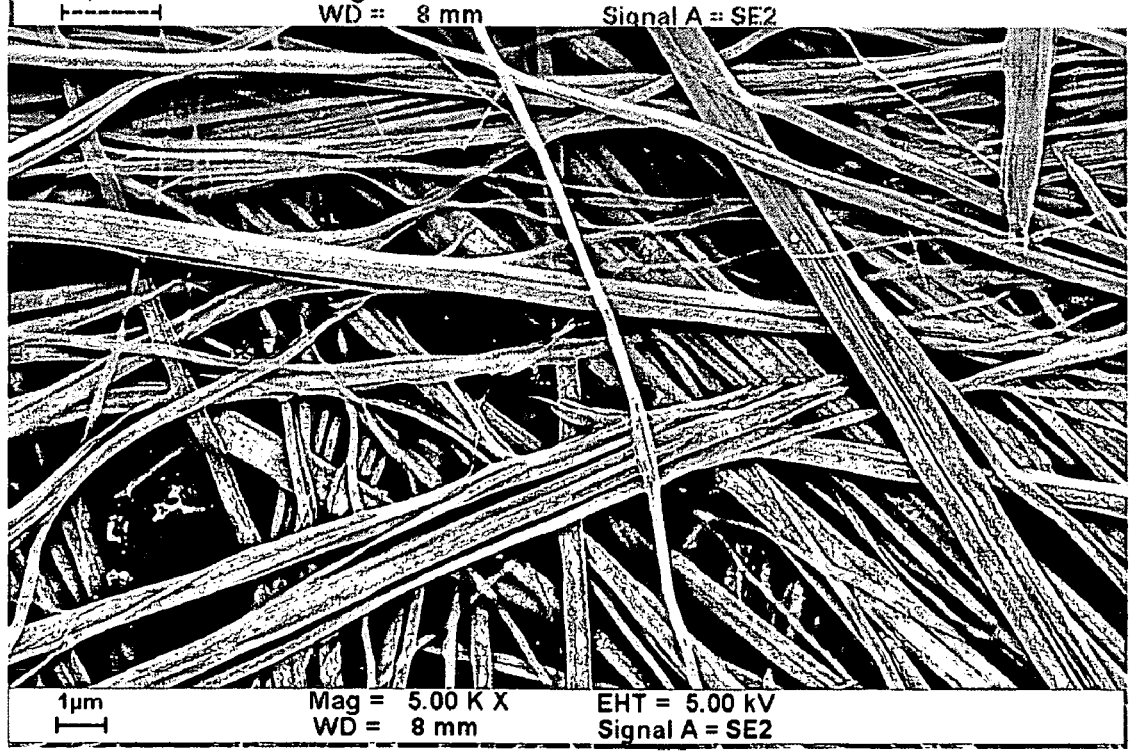

ATTACHMENT 3
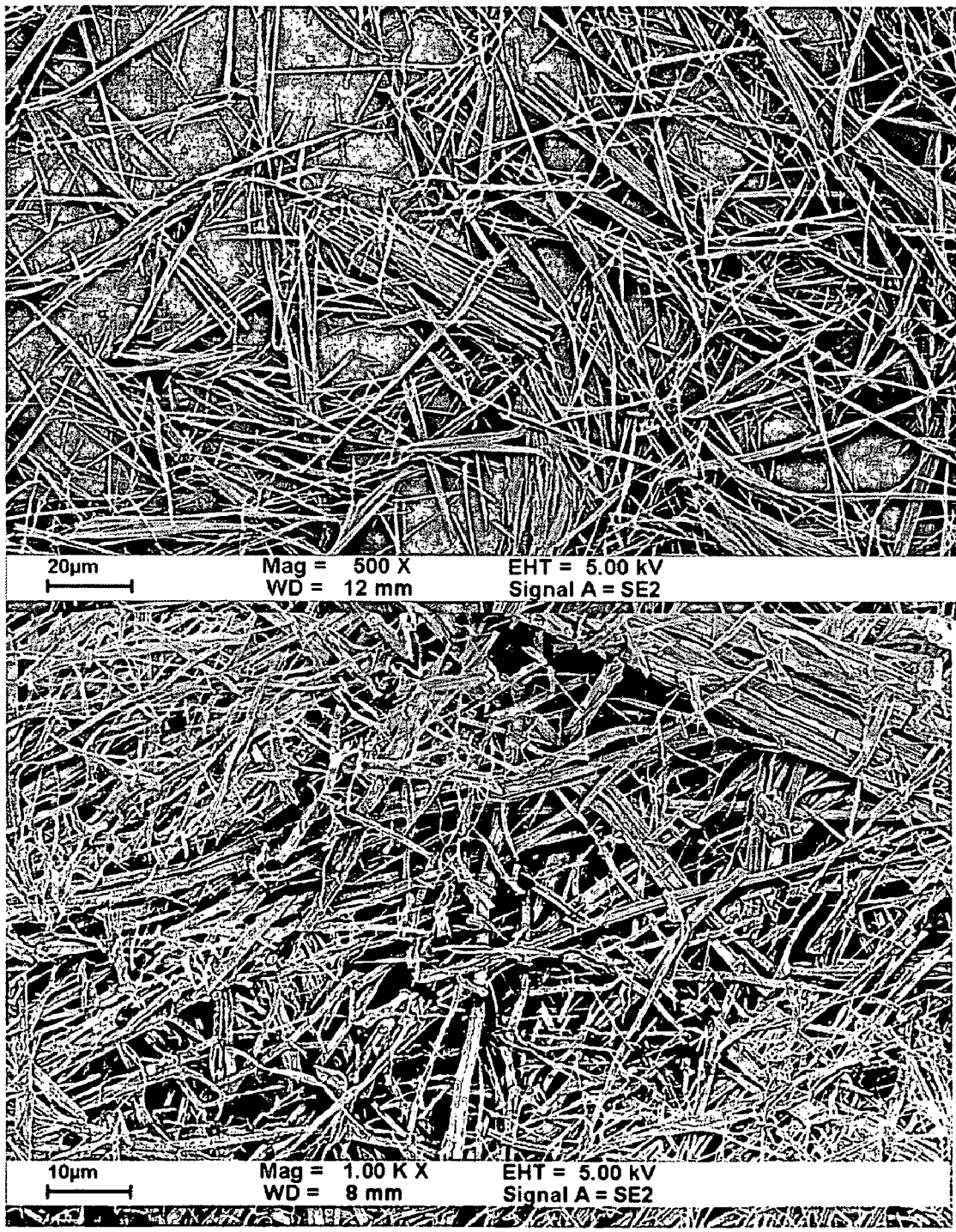

ATTACHMENT 4
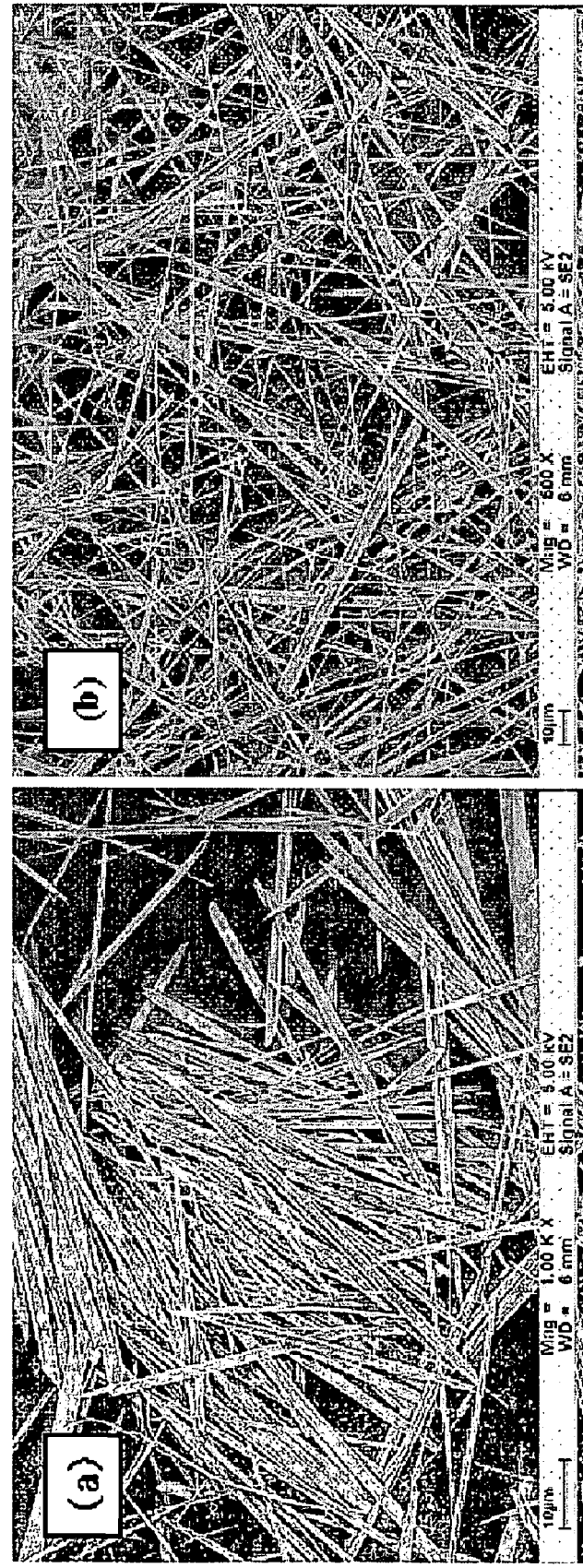

CERIUM-BASED OXIDE FIBER AND ITS FABRICATING METHOD

BACKGROUND OF THE INVENTION

1. Field of the Invention

The present invention relates to a cerium-based oxide fiber and its fabricating method, and more particularly to a cerium-based oxide fiber and its fabricating method of which a chemical modifier is added to a cerium-based nitrate solution for a synthesis by aging below the boiling point of water from 10 hours to 50 hours, and the fibers have a diameter from submicron to micron size, and the aspect ratio of the fibers is greater than 100, and hydrate fibers can be converted to oxide fibers after going through a calcination at a high temperature.

2. Description of the Related Art

Cerium oxide ($CeO_2$) has the same crystalline structure of calcium fluoride ($CaF_2$); its atomic packing configuration is a cubic crystal series; the coordination number of the cerium ion is 8; the crystal lattice constant of cerium oxide is 0.5411 nm; its space group is SFm3m; and the density of highly pure cerium oxide is 7.215 $g/cm^3$.

Since cerium oxide features high reactivity, high activity, and special optoelectronic properties, therefore cerium oxide have extensive applications in many areas. In addition to its traditional applications as a polisher for polishing glass, a catalyst for a catalyst converter in a fuel engine exhaust pipe and a solid electrolyte in a solid oxide fuel cell, cerium oxide also can be used in semiconductor processes in recent years. Since the hardness of cerium oxide powder is appropriate for semiconductor processes, ceramic oxide plays an important role in a chemical mechanical planarization (CMP) polishing process. However, these applications require granule powder of nano level or micron level.

The methods for preparing traditional cerium oxide powder generally include a co-precipitation method and a hydrothermal method, wherein the co-precipitation method adds two or more cation solutions into a precipitating agent to obtain a precipitate with an even composition which can be synthesized into a metal compound of different compositions. The features of the co-precipitation method include controllable particle size and shape. The surface of produced nano powder is highly active, and the co-precipitation method also produces particles with an even diameter and involves simple and easy equipment operations and low costs. However, the drawbacks of the co-precipitation method include its frequent formation of colloidal precipitates which are difficult to filter, and it is necessary to rinse the precipitate several times before removing anion impurities.

The hydrothermal method reacts a solution under a high temperature and a high pressure to assist the growth of the crystalline phase of particles, and its advantage resides on the formation of crystalline grains of a certain grain level and crystalline configurations at a temperature much lower than the calcination temperature which induced sintering of the fine powder. However, the hydrothermal method requires a high-pressure reactor and incurs a high cost, and this method cannot be used for continuous productions. Table 1 summarizes the literatures regarding the cerium oxide powder in recent years and also points out the detailed basic properties of the powders, including the shape, size, and aspect ratio of the powders.

There were many literatures describing the electric properties of cerium oxide in the past, and if a trivalent or quadrivalent cerium ion is added to an oxide lower than the quadrivalence (such as trivalence), an oxygen vacancy will occur. Thus, the electric conductivity of cerium oxide depends on the concentration of oxygen vacancy. Further, cerium has a certain level of electric conductivity. In the report of Tschöpe ["Interface Defect Chemistry and Effective Conductivity in Polycrystalline Cerium Oxide", Journal of Electroceramics, 14, (2005) 5-23], we understand that the crystal size of cerium oxide will affect the ratio of electric conductivities of two ionic species. The smaller the crystalline grain, the stronger is the electric conductivity and the lower ratio of electric conductivities of ions. The main reason is that the electric conductivity of the ion is operated according to oxygen vacancy.

Some silicon impurities may be segregated at the grain boundary of cerium oxide in a synthesis, and thus the boundary impurities will lower its electric conductivity. Among the present cerium oxide additives, gadolinium (Gd) is the most popular one because the size of gadolinium ions is very close to the size of cerium ions, and the valence of gadolinium ions is smaller than the valence of cerium ions, and thus it almost has no stress remained in crystal lattices, and a defect association will not occur at the grain boundary under a low-temperature operation. In other words, the oxygen vacancy will not be fixed, and a very good ionic conductivity for the oxygen-deficient ions at a low temperature of 400° C.~600° C. can be obtained.

However, the precipitates produced by the foregoing co-precipitation method are usually in a colloidal form and cannot be filtered easily, and these precipitates must be rinsed several times before the anion impurities can be removed. The hydrothermal method requires a high-pressure cylinder reactor, and incurs a high cost, but it still cannot be used for continuous productions.

Therefore, the present invention provides a cerium-based oxide fiber and its fabricating method that add a modifier to cerium nitrate solution and go through a water based acid-base reaction to hold the temperature below the boiling point of water and grow cerium-based hydrate fibers in a range from 10 hours to 50 hours. The diameter of these fibers falls into a range from submicron to micron, and the fiber diameter is very even, and the aspect ratio exceeds 100. After this fiber goes through the calcination process, hydrate is converted into oxide, and the fiber remains its fibrous form.

SUMMARY OF THE INVENTION

In view of the shortcomings of the prior art, the inventor of the invention based on years of experience in the related industry to conduct extensive researches and experiments, and finally invented a cerium-based oxide fiber and its fabrication method in accordance with the invention.

Therefore, it is a primary objective of the present invention to overcome the foregoing shortcomings of the prior art by providing a cerium-based oxide fiber and its fabricating method that adopt a hydration incurring a cost much lower than that for a vapor deposition process (such as CVD and EMD) or a melt-spinning process.

Another objective of the present invention is to provide a cerium-based oxide fiber and its fabricating method that only requires a small quantity of chemical modifiers, and thus can save the cost of the expensive additives.

A further objective of the present invention is to provide a cerium-based oxide fiber and its fabricating method, wherein the fibers so produce have an aspect ratio over 100, and maintains the properties of the fibers after going through calcinations and thermal treatments.

Another objective of the present invention is to provide a cerium-based oxide fiber and its fabricating method that add a modifier (citric acid) to grow the cerium-based oxide fiber.

A further objective of the present invention is to provide a cerium-based oxide fiber and its fabricating method that use an additive such as a gadolinium oxide ($Gd_2O_3$) and samarium oxide ($Sm_2O_3$) to change the electric and ionic conductivities of the oxide.

Another further objective of the present invention is to provide a cerium-based oxide fiber, and its fabricating method that converts hydrate into oxide after going through a simple calcination without the complicated fiber drawing process to produce the oxide fibers.

To achieve the foregoing objective, the present invention provides a cerium-based oxide fiber with a composition of $(Ce_{1-x-y}, M1_w, M2_x)O_{2-y-z}(OH)_{2y}(CO_3)_z$ having a first trivalent cation (M1) with w mole (mol) %, a second trivalent cation (M2) with x mole (mol) %, a hydroxyl ion matter with y mole (mol) %, and a carbonate compound with z mole (mol) %, and converted into an oxide and maintaining its fibrous form after going through a calcination.

To achieve the foregoing objective, the present invention provides a cerium-based oxide fiber fabrication method comprising the steps of: adding the modifier, the cerium nitrate, the sodium hydroxide and the metal (M1, M2) nitrate into a solution according to a predetermined ratio (h) of sodium hydroxide to cerium nitrate and a predetermined ratio of M1, M2 to cerium nitrate; waiting till the solutes of the solution are dissolved completely; placing the solution into a constant temperature hot plate or water bath to hold the temperature; and removing the solution and a produced precipitate several hours after the reaction, rinsing the precipitate by deionized water for several times, and performing a calcination to change the hydrated fiber to an oxide.

To make it easier for our examiner to understand the objective of the invention, its formulation, processing steps, fiber structure, innovative features, and performance, we use a preferred embodiment together with the attached drawings for the detailed description of the invention.

Table 1 lists the basic methods and properties for preparing cerium oxide powder and the literatures.

Table 2 lists the parameter settings and used formulations.

Attachments 1a to 1d illustrate how the concentration of a starting material affects the configuration of cerium hydrate products.

Attachment 2 illustrates the microstructure of cerium hydrate fibers.

Figure 3:
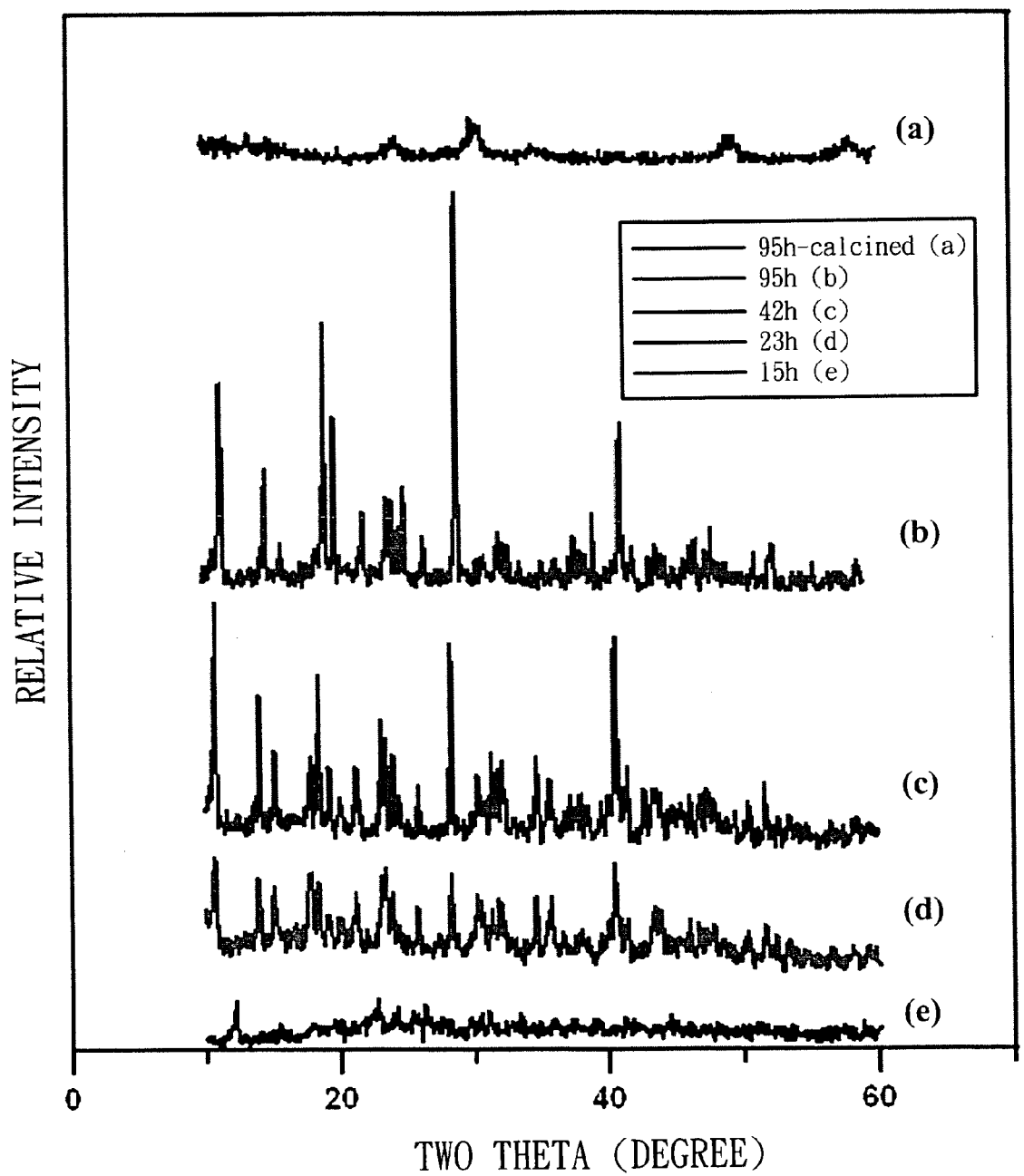
FIGS. 3a to 3e are schematic views of the XRD diffraction spectra of made fibers (sample no. 1-4) under the treatment of different aging periods or calcination at 600° C. for 2 hours.

Attachment 3 illustrates the change of a microstructure of the cerium hydrate fiber before calcination as shown in FIG. 3a and after calcination as shown in FIG. 3b.

Attachments 4a and 4b illustrate the microstructure of the synthesized fibers with either controlled amount of Gd or Sm composition.

DETAILED DESCRIPTION OF THE PREFERRED EMBODIMENTS

The precursors used for making cerium hydrate include hydrated cerium nitrite ($Ce(NO_3)_3 \cdot 6H_2O$, 99.5%, ACROS, USA), sodium hydroxide (NaOH, 96%, SHOWA, Japan), citric acid ($C_6H_8O_7$, >99.5%, ACROS, USA) and deionized water.

Firstly, the sodium hydroxide solution (0.025 to 0.125 M) is added slowly into cerium nitrite solution (0.025M), and white precipitates will be produced in this process, and then citric acid (0.075 to 0.3 M) is added into the solution drop by drop. By then, the white precipitates will be dissolved in the solution slowly. The parameter settings for the experiment of the system are listed in Table 2. After the solution is stirred for approximately 10 minutes and the solution become crystal clear, the solution is reacted at 90° C. for 3 hours to 95 hours, and finally a cerium hydrate is precipitated. After the precipitate is rinsed by deionized water for 5 times, the solid precipitate is obtained by a centrifugal method, and is calcinated below 600° C. for 2 hours.

The synthesized cerium hydrate from the solution and the calcinated sample use an X-ray diffractometer (XRD, Philips PW 1972, Philips Instrument, Netherlands) to analyze their crystalline structure. The morphologies and particle size of the precipitates are analyzed by a scanning electron microscope (SEM, Field Emission, model 1530, LEO Instrument, England).

The display of the XRD diffraction spectra at different aging time appear sharper diffraction peaks of the diffraction pattern as the aging time increases. In other words, the crystalline level of the cerium hydrate crystals increases and becomes better with an increase of aging time. The calcination was conducted and held at 600° C. for 2 hours, and the results showed that cerium hydrate fibers changed to cerium dioxide ($CeO_2$) after the calcination, and the microstructure of $CeO_2$ remained substantially the same as that before the calcination.

Figure 1:
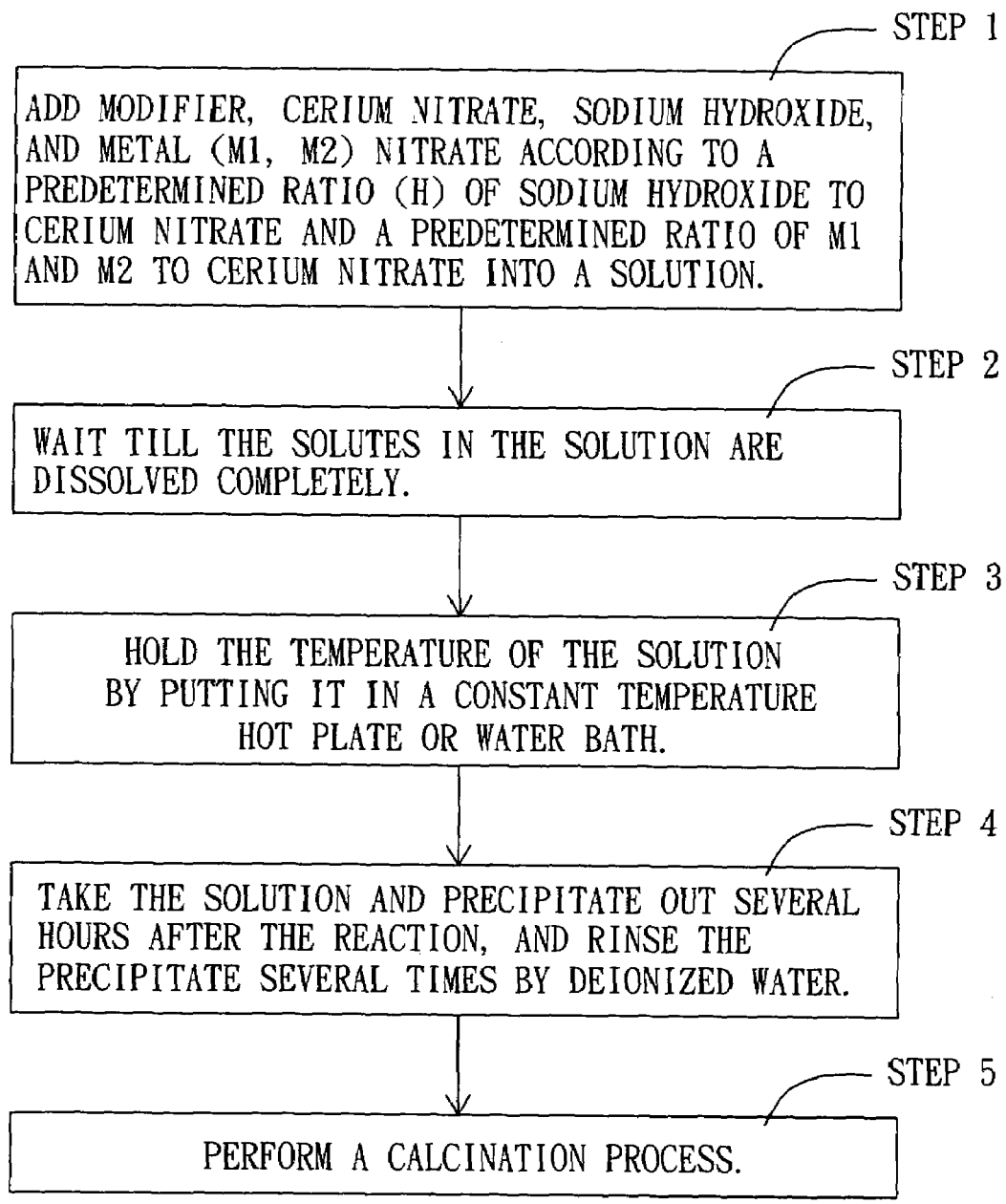
FIG. 1 is a flow chart of the method of fabricating a cerium-based fiber according to a preferred embodiment of the present invention.

Referring to FIG. 1 for the flow chart of a cerium-based fiber fabrication method according to a preferred embodiment of the invention, the aspect ratio of the cerium-based fiber produced by the method of the invention exceeds 100 and possesses the characteristics of fibers after the calcination process. In FIG. 1, the cerium-based fiber fabrication method comprises the steps of: adding a modifier, cerium nitrate, sodium hydroxide, and metal (M1, M2) nitrate according to a predetermined ratio of sodium hydroxide to cerium nitrate and a predetermined ratio of M1 and M2 to cerium nitrates into a solution (Step 1); waiting till the solutes in the solution are dissolved completely (Step 2); placing the solution in a constant temperature hot plate or water bath (Step 3); and removing the solution and a precipitate several hours after the reaction, and rinsing the precipitate several times by deionized water (Step 4).

In the synthesis process of this method, a gadolinium (Gd) or samarium (Sm) compound is used to change the composition of cerium oxide. The compound used as a precursor is hydrated gadolinium nitrate ($Gd(NO_3)_3 \cdot 6H_2O$, 99.9%, ACROS, USA) or hydrated samarium nitrate ($Sm(NO_3)_3 \cdot 6H_2O$, 99.9%, ACROS, USA).

In Step 1, the modifier, cerium nitrate, sodium hydroxide and metal (M1, M2) nitrate according to a predetermined ratio (h) of sodium hydroxide to cerium nitrate and a predetermined ratio of M1 and M2 to cerium nitrates are added into a solution, wherein the modifier is a citric acid or a derived compound of a citric acid. The ratio (h) of sodium hydroxide to citric acid falls in the range of 0.25<h<0.7. The aspect ratio of made cerium-based fibers is from 40 to 200, and the diameter of the cerium-based fiber falls in the range from submicron to micron.

In Step 3, the solution holds its temperature in a constant temperature water bath or hot plate, wherein the holding temperature is from 60° C. to 99° C., and the holding time is 2 hours to 30 hours.

In Step 4, the solution and precipitate are taken out several hours after the reaction, and the precipitate is rinsed several times by deionized water, wherein the solution and precipitate are taken out 12 hours after the reaction, and the precipitate is rinsed 5 times by deionized water to obtain an precipitates which is a hydrated fiber, and a scanning electron microscope (EMM) is used to analyze the configuration of the sample, and an EDS is used to analyze the composition of the sample.

In addition, the cerium-based fiber fabrication method of the invention further comprises a calcination step (Step 5), wherein the hydrated fiber is dehydrated to oxide after going through the calcination.

The produced cerium-based fiber produced by the cerium-based fiber fabrication method of the invention has a composition of $(Ce_{1-x-y}, M1_w, M2_x)O_{2-y-z}(OH)_{2y}(CO_3)_z$ having a first trivalent cation (M1) with w mole (mol) %, a second trivalent cation (M2) with x mole (mol) %, a hydroxyl ion matter with y mole (mol) %, and a carbonate compound with z mole (mol) %. The fiber is converted into an oxide and maintains its fibrous form after going through the calcination.

M1 and M2 are gadolinium or samarium, and the molar concentration if their ions falls in the range of $0.0<x<0.20$; or M1 is gadolinium and $0.0<w<0.165$, and M2 is samarium, and $0.0<x<0.147$.

The hydroxyl ion compound includes $0.0<y<0.30$; and the carbonate compound includes $0.0<z<0.90$. The aspect ratio of long fibers ranges from 0 to 200, and the diameter of the long fibers falls in a range from submicron to micron. In addition, a hydrate substance and a carbonate substance are included, and the hydrate and carbonate substances are changed into oxides after going through the calcination step; wherein the temperature of the calcination ranges from 400° C. to 1300° C., and the calcination time is from 0.1 hour to 50 hours, and less than 1 mole (mol) % of the hydrate and carbonate substances remains after going through the calcinations process.

Referring to Attachments 1a to 1d for the illustration of how the concentration of a starting material affects the configuration of cerium hydrate particles, the way of how the addition of NaOH affects the educt can be seen in Attachments 1a and 1b. In Attachment 1a, sodium hydroxide [NaOH]=0.025M, and no precipitate or particle is produced below an aging time of 20 hours. However, if the concentration of NaOH increases to 0.05M, then we can observe radiating cylindrical cerium hydrates as shown in Attachment 1a. If the concentration of NaOH increases to 0.125M, then the configuration of precipitated cerium hydrates will change to a thin slice shape as shown in Attachment 1b.

In Attachments 1c and 1d, results similar to those of the previous two experiments conducted under the same conditions are obtained. The amounts of NaOH and $C_6H_8O_7$ added will affect the entire configuration of the product. As the concentration of $C_6H_8O_7$ increases, the configuration of the samples changes from separated thin slices into a shape of radiating sheets.

A preliminary conclusion indicates that the configuration of precipitated cerium hydrate changes from radiating sheets into separates thin slices as the pH of the solution increases, and the aspect ratio of cerium hydrate is approximately 5 within an aging time of 20 hours.

Figure 2:
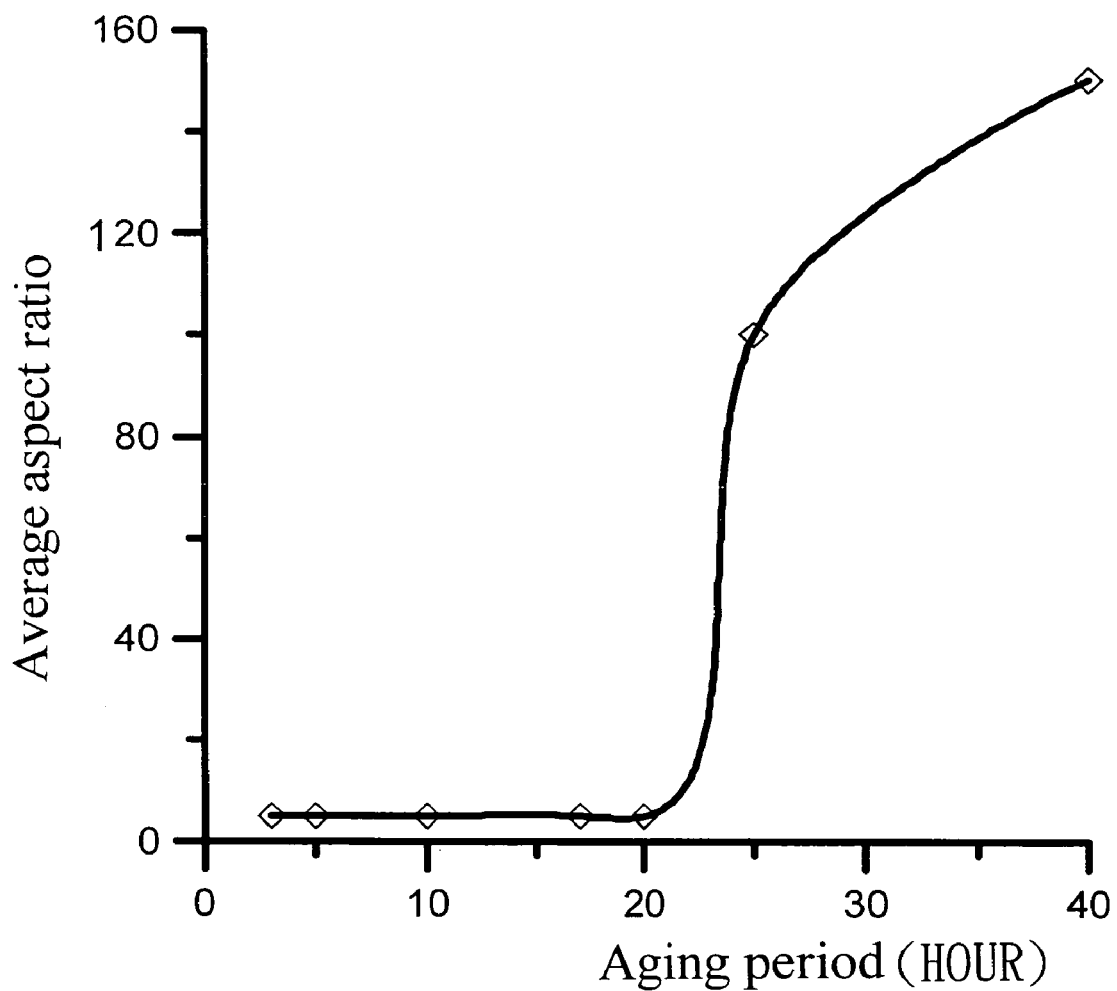
FIG. 2 is a schematic view of the effect of an aging time of samples as described in Attachments 1c and 1d on the aspect ratio of cerium hydrate.

Referring to FIG. 2 for the schematic view of the effect of an aging time of the samples described in Attachments 1d and 1d on the aspect ratio of cerium hydrate, the aspect ratio of the educt is maintained at approximately 5 without much significant different when the aging time is less than 20 hours. However, the aspect ratio of the precipitated cerium hydrate increases drastically when the aging time exceeds 20 hours.

Referring to Attachment 2 for the illustration of the microstructure of cerium hydrate fibers, the average aspect ratio of the synthesized sample under these conditions is found to be approximately 140.

Referring to FIGS. 3a to 3e for the change of XRD diffraction spectrum under different aging periods, the diffraction peak of the diffraction spectrum becomes sharper as the aging time increases, which indicates the crystalline level of the precipitated cerium hydrate becomes better as the aging time increases. Within 15 hours of aging, the sample is an amorphous, but after 23 hours of aging, four crystalline phases, such as cerium hydroxide ($Ce(OH)_3$), hydrated cerium carbonate ($Ce_2(CO_3)_{3x}H_2O$), small amount of cerium hydrocarbonate ($Ce(CO_3)OH$) and citric acid crystals can be found in the XRD diffraction spectrum. The results shown in FIG. 3e indicate that the cerium hydrate fiber transform to cerium dioxide ($CeO_2$) after going through the calcination.

Referring to Attachment 3 for the change of a microstructure of the cerium hydrate fiber before calcination as shown in FIG. 3a and after calcination at 600° C. for 2 hours as shown in FIG. 3b, the fiber maintains its fibrous form after going through the calcination Referring to Attachments 4a and 4b for the illustration of the synthesized fiber powder and the analysis result of its composition, the microstructure shown in Attachments 4a and 4b indicates that the samples added gadolinium or samarium still form a fibrous structure of the hydrate deposit, and the aspect ratio of the fiber exceeds 40, and the maximum reaches 200. The results of the composition analysis (EDS) indicates that the fiber shown in Attachments 4a contains 16.5 mol % of gadolinium, and the fiber shown in Attachments 4b contains 14.7 mol % of samarium, and both gadolinium and samarium participate in the precipitation reaction and enter into the crystalline structure of the hydrated cerium fibers.

In summation of the description above, the cerium-based fiber fabrication method of the invention is characterized, of which a hydration process adds a small amount of surface modifier (citric acid), and the aspect ratio of the fiber exceeds 100, and the fiber still has the fibrous characteristics after going through the calcination step.

Therefore, the cerium-based fiber produced by the cerium-based fiber fabrication method of the invention has the following advantages: 1. The aqueous process is used, and thus the cost is much lower than that of a vapor process (such as CVD and EMD) or a melt-spinning process; 2. The invention just needs a small amount of surface modifier, and thus it can save the cost for expensive additives; 3. The aspect ratio of the fiber exceeds 100, and the fiber still maintains its fibrous properties after going through the calcinations process; 4. The addition of modifier (citric acid) can grow long cerium-based oxide fibers; 5. The addition of gadolinium oxide ($Gd_2O_3$) and samarium oxide ($Sm_2O_3$) can change the electric conductivity of the oxide fibers; Therefore, the cerium-based fibers produced the cerium-based fiber fabrication method of the invention surely can overcome the foregoing shortcomings of the prior art.

In summation of the above description, the present invention herein fabricate ceria fiber by new route and further complies with the patent application requirements and is submitted to the Patent and Trademark Office for review and granting of the commensurate patent rights.

While the invention has been described by means of specific embodiments, modifications and variations could be made by those skilled in the art without departing from the scope and spirit of the invention set forth in the claims.

What is claimed is:

1. A cerium-based fiber fabrication method, comprising the steps of:
    adding a modifier, cerium nitrate, sodium hydroxide, and metal (M1, M2) nitrate into an a solution according to a predetermined ratio (h) of sodium hydroxide to cerium nitrate and a predetermined ratio of M1, M2 to cerium nitrate, wherein said modifier is a citric acid or a citric acid derivative compound;
    waiting till solutes of said solution are dissolved completely;
    placing said solution into a constant temperature machine for holding the temperature; and
    removing said solution and a produced precipitate in several hours after the reaction, and rinsing said precipitate several times by deionized water.

2. The fabrication method of claim 1, wherein said sodium hydroxide and said citric acid have a ratio (h), and $0.25 < h < 0.7$.

3. The fabrication method of claim 1, wherein said fiber has an aspect ratio from 40 to 200.

4. The fabrication method of claim 1, wherein said fiber has a diameter from a submicron to a micron.

5. The fabrication method of claim 1, wherein said holding temperature ranges from 60° C. to 99° C. and said holding time ranges from 2 hours to 30 hours.

6. The fabrication method of claim 1, further comprises a calcination step of changing said fiber into oxide after said fiber goes through said calcination step.

7. A cerium-based fiber fabrication method, comprising the steps of:
    adding a modifier, cerium nitrate, sodium hydroxide, and metal (M1, M2) nitrate into an a solution according to a predetermined ratio (h) of sodium hydroxide to cerium nitrate and a predetermined ratio of M1, M2 to cerium nitrate;
    waiting till solutes of said solution are dissolved completely;
    placing said solution into a constant temperature machine for holding the temperature; and
    removing said solution and a produced precipitate in several hours after the reaction, and rinsing said precipitate several times by deionized water; wherein said cerium-based fiber contains $(Ce_{1-x-y}, M1_w, M2_x)O_{2-y-z}(OH)_{2y}(CO_3)_z$.

8. The fabrication method of claim 7, wherein said M1 and said M2 are gadolinium or samarium.

9. The fabrication method of claim 7, wherein said M1 is gadolinium, and $0.0 < w < 0.165$.

10. The fabrication method of claim 7, wherein said M2 is samarium, and $0.0 < x < 0.147$.

11. The fabrication method of claim 7, wherein said cerium-based fiber contains $0.0 < y < 0.30$.

12. The fabrication method of claim 7, wherein said cerium-based fiber contains $0.0 < z < 0.90$.

13. The fabrication method of claim 6, wherein said calcination step is conducted at a temperature from 400° C. to 1300° C. for 0.1 hour to 50 hours.

* * * * *